(12) United States Patent
Cohen et al.

(10) Patent No.: US 8,767,835 B2
(45) Date of Patent: Jul. 1, 2014

(54) METHOD FOR CODING VIDEOS USING DICTIONARIES

(75) Inventors: Robert A. Cohen, Somerville, MA (US); Jewon Kang, Wilmington, CA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 401 days.

(21) Appl. No.: 12/979,414

(22) Filed: Dec. 28, 2010

(65) Prior Publication Data

US 2012/0163451 A1 Jun. 28, 2012

(51) Int. Cl.
*H04N 7/50* (2006.01)
*H04N 7/26* (2006.01)
*H04N 7/32* (2006.01)
*H04N 7/30* (2006.01)

(52) U.S. Cl.
USPC ............. 375/240.24; 375/240; 375/240.01; 375/240.25; 375/240.26

(58) Field of Classification Search
USPC ............ 375/240, 240.01, 240.24, 240.25, 375/240.26
See application file for complete search history.

(56) References Cited

U.S. PATENT DOCUMENTS

| | | | |
|---|---|---|---|
| 8,391,370 B1 * | 3/2013 | Mukherjee et al. | 375/240.24 |
| 8,625,672 B2 * | 1/2014 | Lai et al. | 375/240.16 |
| 2002/0058501 A1 * | 5/2002 | Hannu et al. | 455/422 |
| 2002/0154227 A1 * | 10/2002 | Lan et al. | 348/240.2 |
| 2003/0058943 A1 * | 3/2003 | Zakhor et al. | 375/240.12 |
| 2004/0240559 A1 * | 12/2004 | Prakasam et al. | 375/240.25 |

FOREIGN PATENT DOCUMENTS

| | | | |
|---|---|---|---|
| WO | 2010087807 A1 | | 5/2010 |
| WO | WO 2010087807 A1 * | | 8/2010 |
| WO | WO 2012090975 A1 * | | 7/2012 |

OTHER PUBLICATIONS

V.K. Goyal, M. Vetterli, & N.T. Thao, "Quantized Overcomplete Expansions in RN: Analysis, Synthesis, and Algorithms", 44 IEEE Transactions on Info. Theory 16-31 (Jan. 1998).*
D. Marpe, H. Schwarz, & T. Wiegand, "Context-Based Adaptive Binary Arithmetic Coding in the H.264/AVC Video Compression Standard", 13 IEEE Trans. on Circuits & Sys. for Video Tech. 620-636 (Jul. 2003).*

(Continued)

*Primary Examiner* — Dave Czekaj
*Assistant Examiner* — David N Werner
(74) *Attorney, Agent, or Firm* — Dirk Brinkman; Gene Vinokur

(57) ABSTRACT

A video encoded as a bit stream is decoded by maintaining a set of dictionaries generated from decoded prediction residual signals, wherein elements of the set of dictionaries have associated indices. A current macroblock is entropy decoded and inverse quantized to produce decoded coefficients. For the current macroblock, a particular dictionary of the set of dictionaries is selected according to a prediction mode signaled in the bit stream, and particular elements of the particular dictionary are selected according to a copy mode signal in the bit stream and the associated index. The particular elements is scaled and combined, using the decoded coefficients, to reconstruct a current decoded macroblock prediction residual signal. Then, the current decoded macroblock prediction residual signal is combined with previously decoded macroblocks to generate an output macroblock of a reconstructed video, wherein the steps are performed in a decoder.

18 Claims, 6 Drawing Sheets

(56) References Cited

OTHER PUBLICATIONS

Je-Won Kang et al: "Efficient dictionary based video coding with reduced side information", Circuits and Systems (ISCAS), 2011 IEEE International Symposium on, IEEE, May 15, 2011, pp. 109-112, XP031997582, D0I: 10.1109/ISCAS.2011.5937513 ISBN: 978-1-4244-9473-6 the whole document.

Ralph Neff et al: "Very low Bit-Rate Video Coding Based on Matching Pursuits," IEEE Transactions on Circuits and Systems for Video Technology, IEEE Service Center, Piscataway, NJ, US, vol. 7, No. 1, Feb. 1, 1997.

Gharavi-Alkhansari M et al. "Casual Fractal Compression of Video Sequences using Matching Pursuit," International Journal of Imaging Systems and Technology, Wiley and Sons, New York, US, vol. 9, No. 5, Jan. 1, 1998.

Battiato S et al. "Statistical Modeling of Huffman Tables Coding," Image Analysis and Processing—ICIAP 2005 Lecture Notes in Computer Science; LNCS, Springer, Berlin, DE, p. 711-718, Jan. 1, 2005.

Yan Ye et al. "Improved h.264 Intra Coding Based on Bi-Directional Intra Prediction, Directional Transform, and Adaptive Coefficient Scanning," Image Processing, 2008. ICIP 2005. 15th IEEE International Conferencem IEEE, Piscataway, NJ, USA, p. 2116-2119, Oct. 12, 2008.

Mehmet Turkan et al. "Sparse Approximation with Adaptive Dictionary for Image Prediction," Image Processing, 2009, ICIP. 16th IWWW International Conference On, IEEE Piscataway, NJ, USA, p. 25-28, Nov. 7, 2009.

Mehmet Turkan et al. "Image Prediction: Template Matching Vs. Sparse Approximation," Image Processing (ICIP), 2010 17th IEEE International Conference On, IEEE, Piscataway, NJ, USA, p. 789-792, Sep. 26, 2010.

Dremeau A et al. "Sparse Optimization with Directional DCT Bases for Image Compression," Acoustics Speech and Signal Processing (ICASSP), 2010 IEEE International Conference On, IEEE, Piscataway, NJ, USA, p. 1290-1293, Mar. 14, 2010.

Je-Won Kang et al. "Efficient Dictionary Based Video Coding with Reduced Side Information," Circuits and Systems (ISCAS), 2011 IEEE International Symposium On, IEEE, p. 109-112, May 15, 2011.

* cited by examiner

METHOD FOR CODING VIDEOS USING DICTIONARIES

FIELD OF THE INVENTION

This invention relates generally to video encoding and decoding, and more particularly to a method for coding a video using dictionaries.

BACKGROUND OF THE INVENTION

A video coding standard project, called High Efficiency Video Coding (HEVC), has been started by a Joint Collaborative Team on Video Coding (JCT-VC). One goal of this standard is to improve the coding performance over the older H.264/AVC standard in broader applications and wider bit ranges. The initial framework of the HEVC video coding standard is not much significantly different from previous video coding standard, such as in a block based prediction technique, a 2-D Discrete Cosine Transform (DCT) transform, and context based entropy coding. The new coding tools are more advanced and flexible, but with an increased computational complexity. Like conventional coding techniques, the encoder and decoder operate on a sequence of frames of the video. The frames in the video are partitioned into macroblocks of pixels. The macroblocks can be spatially adjacent within a frame (for intra mode coding), and temporally adjacent in successive frames (for inter mode coding)

Orthogonal and bi-orthogonal complete dictionary such as DCT or wavelet have been used for dominant transform domain representation in image and video coding. Sparse and redundant representation of signals over an overcomplete dictionary has been successfully applied to various applications, such as image denoising.

An overcomplete video coding technique can achieve a competitive coding gain at very low bit rates compared with conventional video coding standards. Basically, the block based 2-D DCT transform is replaced with an expansion of larger and more suitable basis functions in the overcomplete video coding. At low bit rate video coding, residual signals are represented with fewer nonzero DCT coefficients because of a larger quantization parameter (QP), and thus only low frequency components appear in a macroblock. In this scenario, the set of overcomplete dictionaries can provide a more various and faithful expression of residual signals than the complete set of dictionaries. Thus, the residual signal can be approximated better with fewer coefficients.

Conventional overcomplete video coding constructs a set of dictionaries with modulated Gabor functions. Matching pursuits (MP) is used to select the most appropriate dictionary elements in the representation. MP determines a suboptimal solution for the sparse signal representation. The set of dictionaries can be varied by concatenating dictionaries generated by several analytic functions such as wavelet, curvelets, and discrete Fourier transforms (DFT). Curvelets are an extension of the wavelet concept. Curvelets use a non-adaptive technique for multi-scale object representation. Wavelets generalize the Fourier transform by using a basis that represents both location and spatial frequency. For 2D or 3D signals, directional wavelet transforms use basis functions that are also localized in orientation. A curvelet transform differs from other directional wavelet transforms in that the degree of localization in orientation varies with scale.

However, those models have drawbacks despite their simplicity. Natural images or videos often contain features that are not well-represented by these models. In these cases, poor reconstruction or artifacts such as ringing can be introduced into the decoded image or video.

Dictionary training can be used because residual signals tend to have a directional orientation after the prediction. Therefore, a set of dictionaries can be well designed by reflecting the characteristics of the residual signals. Mode dependent directional transform can be used for intra coding. A complete dictionary can be constructed using intra prediction residuals corresponding to the directional prediction. Dictionary training can also be adapted to a intra prediction in image coding applications.

SUMMARY OF THE INVENTION

The embodiments of the invention provide a method for encoding and decoding a video using a set of dictionaries. The set of dictionaries is trained using samples, wherein the samples are inter or intra predicted residual signals. The set of dictionary elements can also be used for adjacent macroblocks. An optimal number of dictionary elements is determined using rate-distortion optimization.

DETAILED DESCRIPTION OF THE PREFERRED EMBODIMENT

A signal $y \in \mathfrak{R}^n$ can be represented as a sparse linear combination of m elements in overcomplete dictionaries $D \in \mathfrak{R}^{n \times m}$, where m is substantially larger than n and D is a full-rank matrix.

We define the dictionaries to be overcomplete when the number of nonzero elements is greater in number than those in a basis. Overcompleteness achieves a more stable and compact representation.

We approximate the signal y with a smallest number of dictionary elements. The sparse representation is determined according to $$\min_x \|x\|_0 \text{ s.t. } \|y - Dx\|_2 \leq \delta, \quad (1)$$

where $x \in \mathfrak{R}^m$ is a vector of the coefficients representing the signal y, $|.|$ denotes a $l_p$ norm of the signal, and $\delta$ is a small, predetermined threshold.

The dictionaries are trained to better fit the sample data. Thus, the minimization problem in Eqn. (1) can be converted to obtain the best dictionaries for a given sparsity constraint C for the representation of the signal y as $$\min_{x,D} \|y - Dx\|_2 \quad \text{s.t.} \quad \|x\|_0 \le C, \quad (2)$$

The dictionaries are trained to provide better representation of the actual signal when the number of nonzero coefficients are less than or equal to C.

Figure 3:
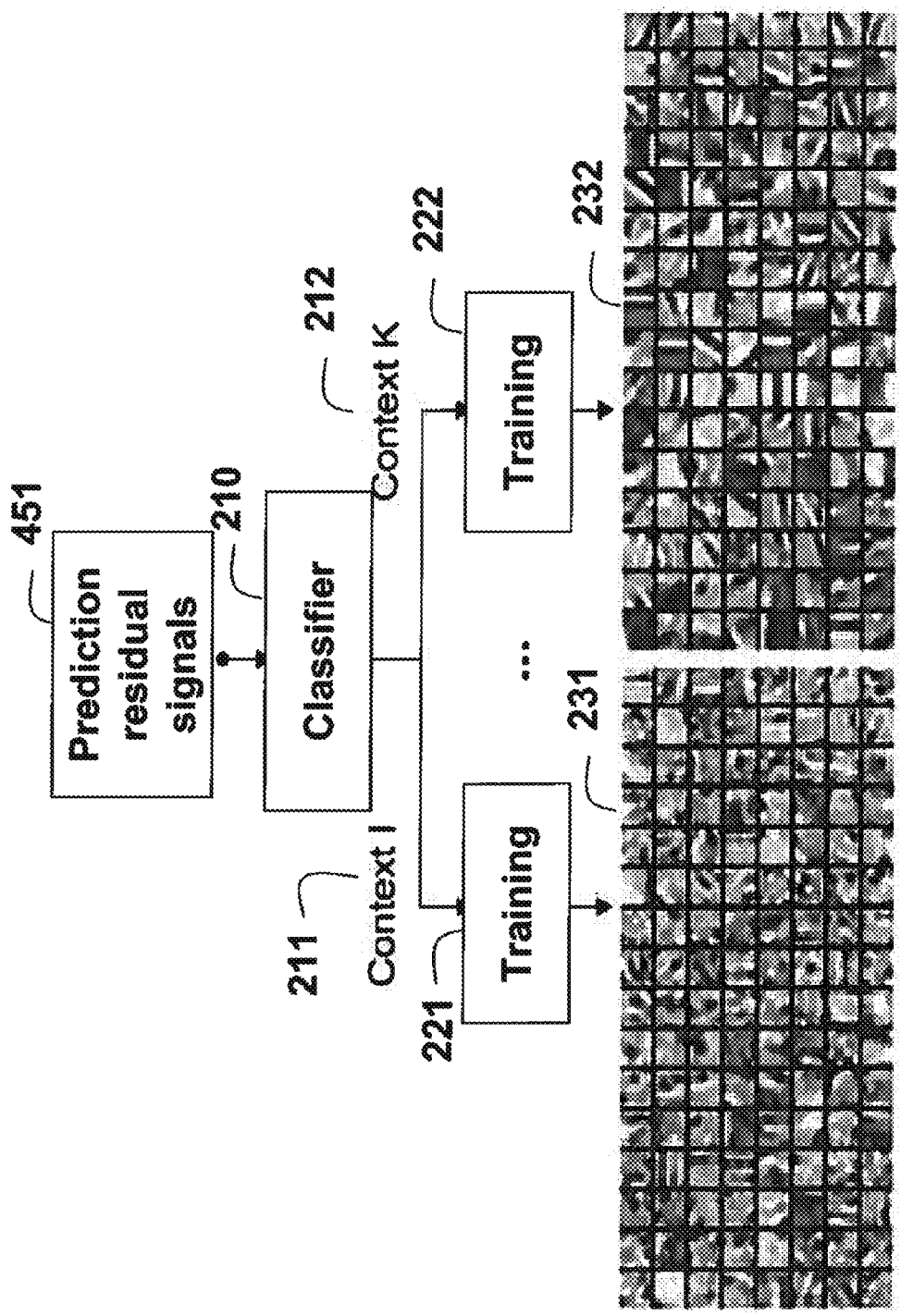
FIG. 3 is a schematic of a process for construction overcomplete dictionaries according to embodiments of the invention.

As shown in FIG. 3, unlike conventional image coding, we perform either intra or inter prediction, and then encode residual data samples 451 of the video signal. A classifier 210 generates context I 211 and context K 212 for the corresponding training 221-222 of the contexts I and K. As shown in FIG. 3, the dictionary 231 of context K contains more diagonal elements than the more random elements of dictionary 232 for context I. The diagonal elements are useful for edge representations in inter coding.

Thus, in one embodiment of the invention, the dictionaries are trained using the prediction residual signals 451 before the encoding of a current video sequence. Such training is typically done offline using a separate set of training videos. Both the encoder and the decoder have the same set of dictionaries, which are typically fixed for the coding of the video sequence.

In another embodiment of the invention, the dictionaries are trained using the prediction residual signals 451 during the encoding and decoding of a current video sequence. With this embodiment, the data used for training includes the prediction residual signals associated with previously decoded samples of the current video which are available at both the encoder and decoder. Both the encoder and the decoder maintain the same set of dictionaries, but the dictionaries are dynamic and updated on a periodic basis during the encoding and decoding processes of the video sequence.

The dictionary training can ignore local variances of the residual signal characteristics a relatively small set of dictionary elements are generated from a very large set of training data. Thus, some salient features of residual samples can be deleted from the set of dictionaries. To solve this problem, we apply the contexts 211-212 of the residual samples when training 221-222 the dictionaries.

The classifier 210 can vary with a type of residual sample. For example, in an intra coded residual, we rely on the assumption that the residual samples have a certain characteristics with the directional intra prediction in an encoder/decoder (codec) according to the H.264/AVC standard. Therefore, the multiples sets of dictionaries are constructed from the samples 451 corresponding to the prediction directions, respectively.

After the intra prediction mode for a given macroblock is decided, the classifier 210 is used to indicate which context 211-212 to use, and then the corresponding dictionary is applied during the encoding. Thus, no additional side information is required in the decoder. In the inter coded residual signal, the classifier examines the energies of the samples and forwards the energies to the corresponding training modules to generate our context adaptive dictionaries. Thus, the contexts are determined by data already available in the decoder.

Elements of the Dictionaries Based Video Coding

After the sets of dictionaries are trained from universal data samples, the dictionaries are used for a sparse representation of the input residual signal during the encoding.

Figure 1:
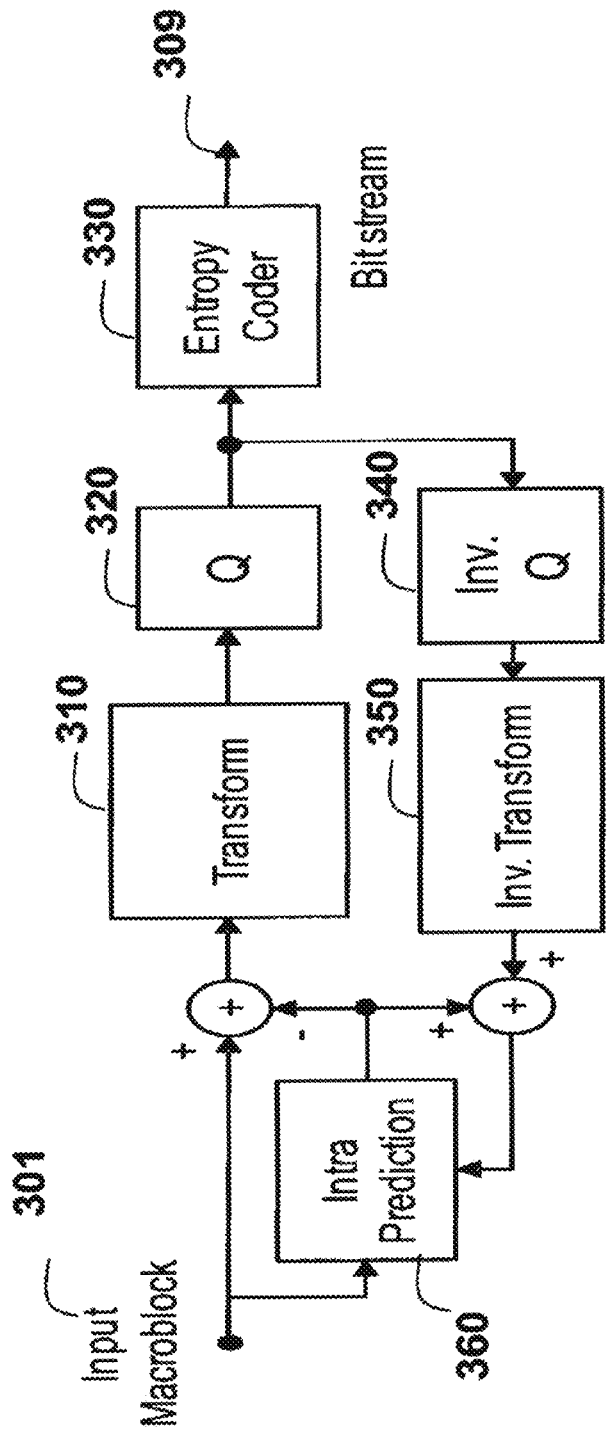
FIG. 1 is a block diagram of a prior art encoder.

FIG. 1 shows a conventional encoder. Input is a macro block 301 and output is a bit stream 309. The macroblock is transformed 310, quantized 320 to a quantized signal. The quantized signal is entropy coded 330 to produce the bit stream 309. Output of the entropy coder is also inverse quantized 340, inversed transformed 350 and used for intra prediction 360 when combined with the input macroblock 301.

Conventional Decoder

Figure 4:
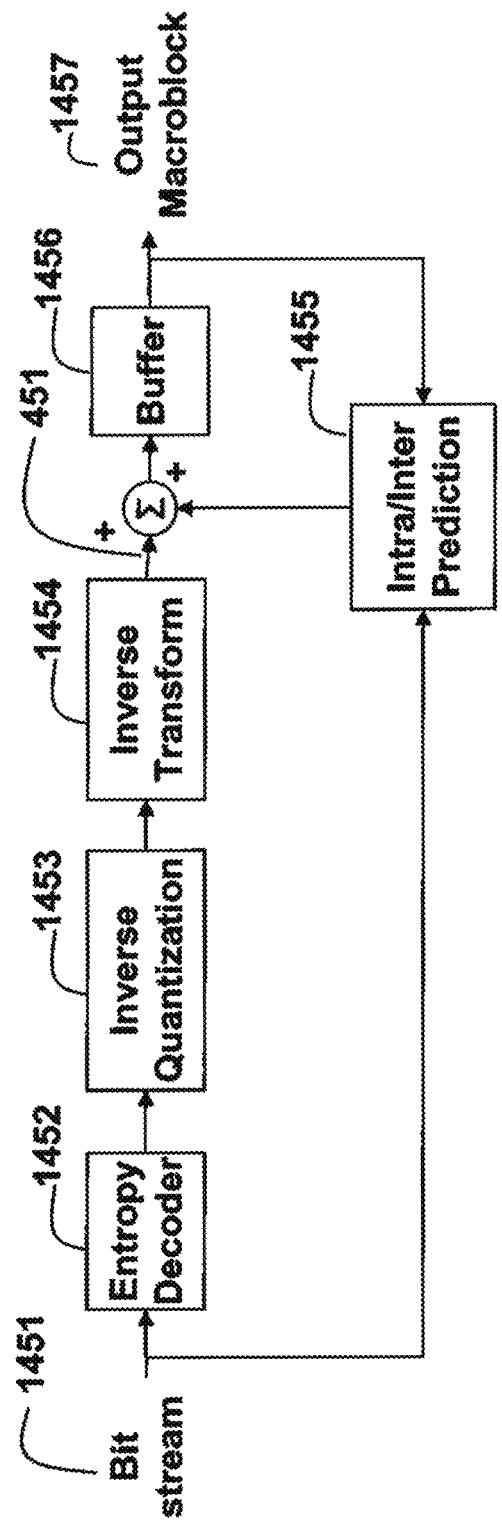
FIG. 4 is a block diagram of a prior art decoder.

FIG. 4 shows a conventional decoder. The input is a bit stream 1451 and the output is a macroblock 1457. The bit stream is entropy decoded 1452, and inverse quantized 1453. The decoded transform coefficients are inverse transformed 1454. An intra or inter prediction residual 1455 is combined 1456 to produce a decoded macroblock. This macroblock is output and stored in a buffer 1456 to be used for reconstruction future decoded macroblocks.

Dictionary-Based Encoder

Figure 2:
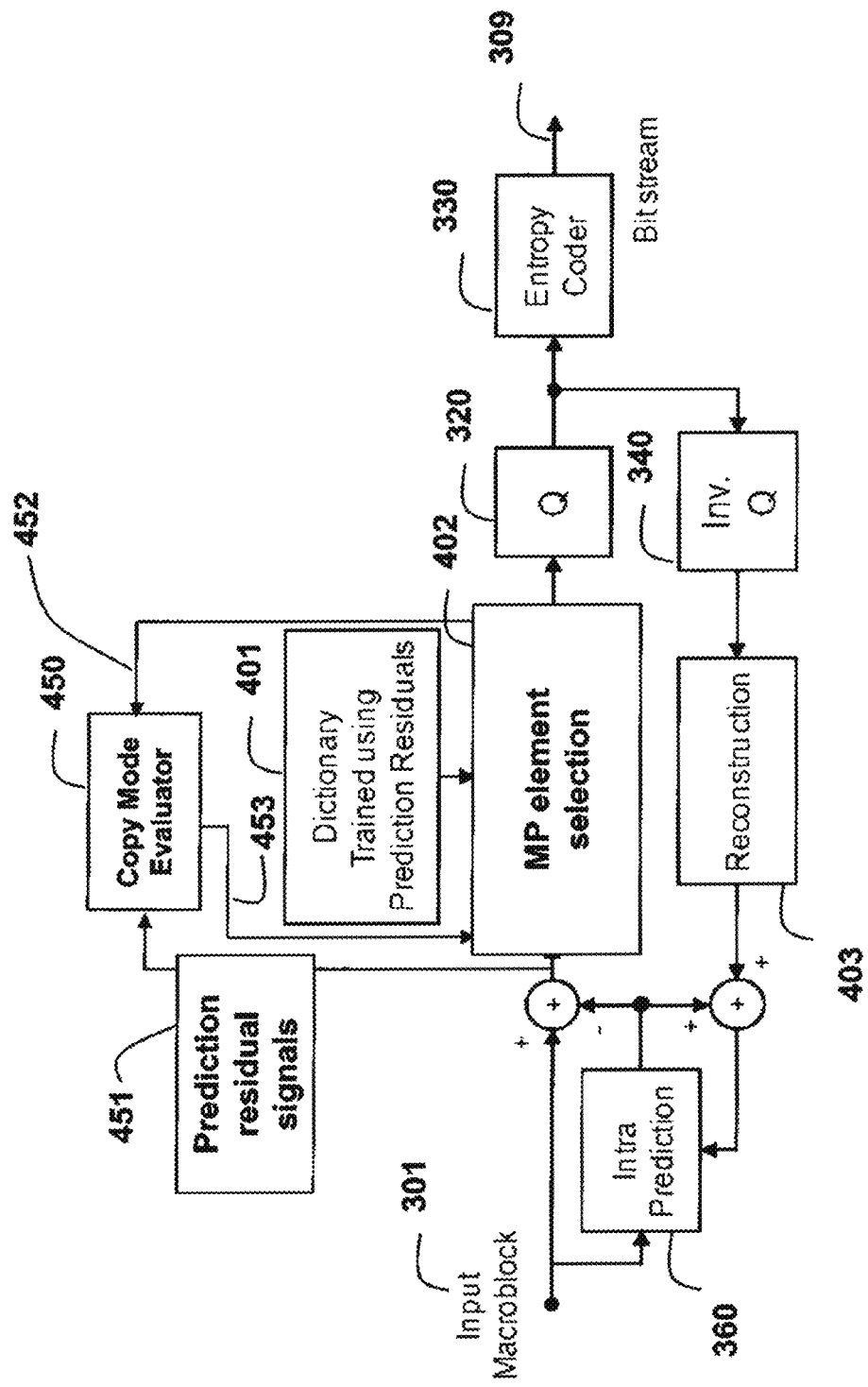
FIG. 2 is a block diagram of an encoder according to embodiments of the invention.

FIG. 2 shows the encoder according to embodiments of the invention. The steps of the encoder can be performed in a processor connected to memory and input/output interfaces as known in the art.

Input to the encoder is a current macroblock 301. Dictionaries for a particular segment of the video are trained 401 using the prediction residual signals 451 before the encoding of the particular segment of video proceeds. The best matching basis among the dictionary elements (atoms) are selected 402 prior to the quantization 320. A process, such as matching pursuit (MP), can be used for the element selection 402.

A copy mode evaluator 450 takes as input dictionary indices that were used for previous blocks 452, prediction residual signals 451, a dictionary pointer, dictionary element indices, and a distortion of the current block when coded using its own dictionary elements, i.e., elements that are selected without using the copy mode evaluator. The evaluator generates a copy mode signal 453, which depends on the outcome of a rate-distortion optimized decision process that evaluates whether using a set of previously-computed dictionary indices performs better than using newly-computed dictionary indices. The copy mode evaluator (CME) is shown in FIG. 6.

Figure 6:
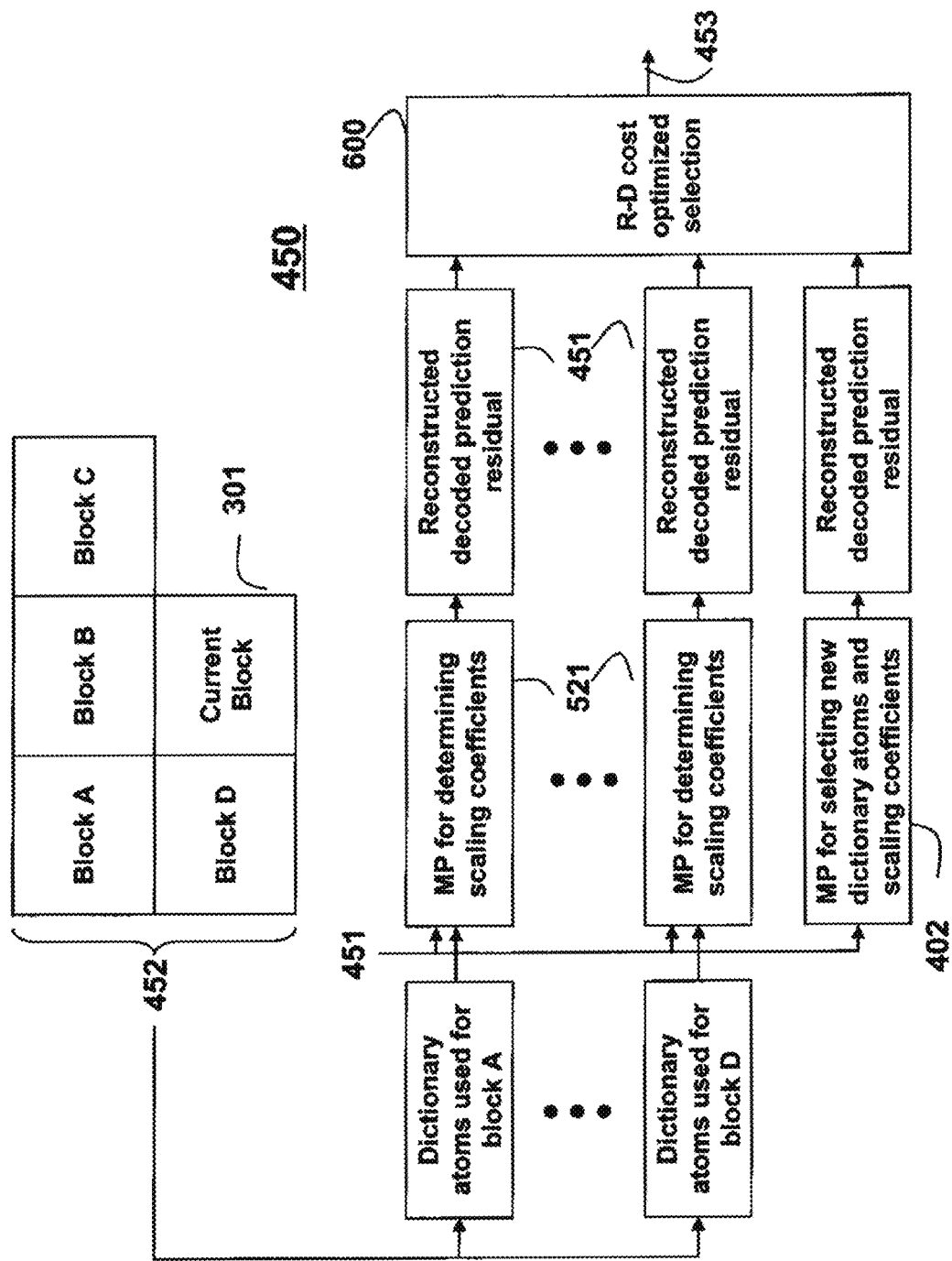
FIG. 6 is a block diagram of a copy mode evaluator, according to the embodiments of the invention.

Briefly with reference to FIG. 6, inputs to the CME are the dictionary indices that were used for previously coded blocks 452 and the prediction residual for the current block 301. A specific dictionary (A-D) is used for the current block to determine scaling coefficients 402, and then reconstructed decoded prediction residuals 451, which are input to the R-D cost optimization process 600 to produce the copy mode signal 453.

Continuing with FIG. 2, the selected dictionary elements are inverse quantized 340 to generate an inverse quantized signal, which is entropy encoded 330 to produce the bit stream 309. The video is reconstructed 403 from an inverse quantized 340 signal. The reconstructed video is then used for intra prediction 360.

MP is known to be a suboptimal and tractable solution in a sparse signal representation. In a preferred embodiment of this invention, we use the MP to select 402 appropriate elements in the dictionaries. During each iteration, the MP forms a linear combination of dictionary elements by minimizing the residual signal of the reconstructed video. Thus, it is required to include the coefficient values and a set of one or more indices indicating which dictionary elements are used to reconstruct the signal in the decoder. The iterations do not exceed the sparsity constraint C of Eqn. 2, and terminate when the rate-distortion (R-D) costs are minimized so that the signals can be optimally represented with a number of non-zero coefficients that is less than or equal to the sparsity constraint.

After the selection 402 of dictionary elements, the coefficients are passed to the quantization 320 and entropy coding 330. A Laplacian distribution can be fitted for plotting the coefficient distributions of the set of dictionaries used by our method. Thus, an uniform quantizer is efficiently adapted to the method.

In the entropy coder 330, the scaling coefficient values are binarized via a Huffman table based on statistics of the scaling coefficients. The occurrence of dictionary indices are mostly uniform over the indices, so any adaptive or fixed scanning order cannot efficiently collect the nonzero coefficients. Thus, the indices are encoded with fixed length codes whose size are $\log_2\lceil m \rceil$, where m is the number of the dictionary elements.

During the reconstruction 403, which is also performed by the decoder, the quantized scaling coefficients are used for the weights in the linear combination of the dictionary elements. The set of dictionary elements that are used is represented by a set of indices.

In addition to the processing described above, the encoder also incorporates the copy mode evaluator (CME) 450. The inputs to the CME are the current prediction residual signals to be coded, and the set of dictionary pointers and element indices used to encode previously encoded blocks. The dictionary pointer indicates which dictionary was used to encode a previously coded block, and the element indices indicate which elements within that dictionary were used to encode a previously coded block.

Then, the CME re-encodes the current prediction residual using the same elements that were used to encode a previously coded block. This process is repeated for several other previously coded blocks. Typically blocks adjacent to the current block are examined, e.g., the block to the left, the block above, the block above and to the left, and the block above and to the right.

The distortion values generated for all cases, along with the distortion generated using the dictionary element selection described above, are compared. If the dictionary element yields the least distortion, then the dictionary element indices and corresponding scaling coefficients are included in the output bit stream.

If one of the copy modes yielded the least distortion, the copy mode signal, and an indicator signaling which copy mode was best is included in the bit stream. In the case where the copy mode is used, there is no need to signal dictionary element indices at this point in time, because the indices were already transmitted when an earlier block was coded.

Dictionary-Based Decoder

Figure 5:
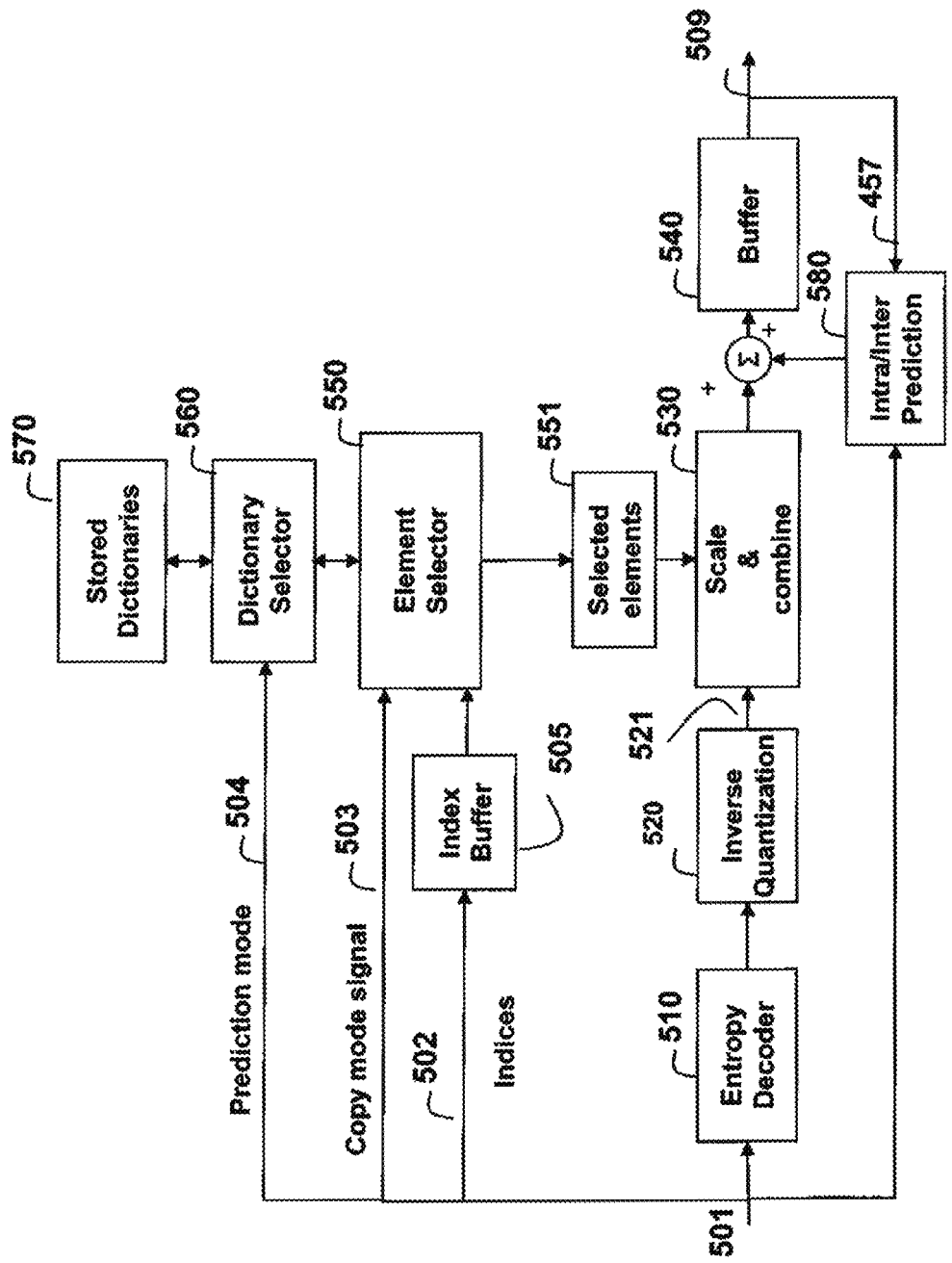
FIG. 5 is a block diagram of a decoder according to the embodiments of the invention.

FIG. 5 shows the decoder according to embodiments of the invention. The input is an encoded video bit stream 501 and the output is a decoded macroblock 509. Each current macroblock in the bit stream is entropy decoded 510, and inverse quantized 520 to generate decoded coefficients 521. The coefficients are input to the scaler and combiner 530. The coefficients are used to scale one or more dictionary elements. The scaled elements are typically linearly combined to reconstruct the decoded macroblock prediction residual signal. This residual is combined with previously-decoded macroblocks stored in a buffer 540 to generate the output macroblock 509.

Indices 502 decoded from the bit stream 501 are stored in an index buffer 505. The indices are used to select 550 the dictionary elements 551 that are used to reconstruct the current prediction residual. In cases where indices are not received via the bit stream, the copy mode signal 503 used to indicate which set of previously-used dictionary elements are used to decode the current block. For example, the copy mode value can indicate that the elements used to generate the block to the left of the current block are used to reconstruct the current block. In another example, the elements used to generate the block above the current block can be used. The main purpose of having this copy mode signal is that is requires much fewer bits as compared to the indices.

Because individual stored dictionaries 570 can be available depending upon the prediction mode used at the encoder, the prediction mode signal 504 is used to select 560 which of the stored dictionary to use in the decoder. The prediction mode 504 is also used by the intra/Inter prediction module 580 in the decoder, similar to the way the prediction mode is used in a conventional decoder.

R-D Optimal Dictionary Element Selection

The dictionary elements are selected 550 by the MP, and the coefficients are determined during the iterations. An important feature of most video coding standards is R-D optimization, which is used for several decision processes such as when to terminate the iterative MP process performed in 550 and described below in Equation (3), and in module 600 of the copy mode evaluator of FIG. 6. Instead of a fixed number of coefficients, an encoder can provide the best sparse approximation by minimizing the R-D costs defined by $D(N)+\lambda R(N)$, where $R(N)$ is the estimated number of bits, $D(N)$ is the mean square error (MSE) between the original and reconstructed signal, and $\lambda$ is a Lagrangian multiplier.

The R-D distortion also indicates when the encoder is to terminate the iteration in the MP. With dropping N, the optimal number of nonzero coefficients can be determined by $$N^* = \underset{N \in \{0,1,\ldots,C\}}{\mathrm{argmin}} \{D(N) + \lambda R(N)\} \quad (3)$$
$$= \underset{N \in \{0,1,\ldots,C\}}{\mathrm{argmin}} \{D + \lambda(R_H + R_C + R_I)\},$$

where C is the given sparsity constraint, and $R_H$, $R_C$, and $R_I$ indicate the required bits for header, MP scaling coefficients, and indices representation, respectively.

The header information includes the number of nonzero coefficients, i.e., the number of iteration, so that the decoder determines the correct number of elements during reconstruction. The encoder provides the best sparse approximation in the constraints of a certain bit budget by the optimal value. This process is also available for use in the decoder, e.g. in the dictionary element selector 550 of FIG. 5.

Advanced Coding Technique with Dictionary Index Copy Method

In addition to the dictionary index selection process using MP, we also provide an index copy method. Generally, it can be assumed that adjacent blocks have similar contexts in the spatial domain. And, the dictionary elements behave as basis functions during reconstruction. Thus, the same set of dictionary elements can be reused among adjacent blocks when similar patterns appear in the adjacent residual signals. The coefficients of the current signal are determined by applying the previous dictionary elements. Therefore, the encoder can reduce the amount of required bits for the index coding. A flag is signaled to indicate the source of the index sets, which have been selected 600 by examining the R-D costs among the candidates.

The index copy method can be efficient when the signal characteristics are substantially stable in adjacent blocks. Therefore, the method can be adapted to adjacent blocks in homogeneous areas of a video.

Effect of the Invention

The invention provides dictionary based video encoding technique based on context adaptive overcomplete dictionaries. We train a set of dictionaries using inter and/or intra predicted residual samples, and applied the dictionaries to a sparse signal representation. Dictionary elements are available for re-use for coding subsequent samples.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding a video encoded as a bit stream in a video decoder, comprising the steps of:
    maintaining a set of dictionaries generated from decoded prediction residual signals, wherein elements of the set of dictionaries have associated indices, and wherein each dictionary includes multiple elements;
    entropy decoding and inverse quantizing a current macroblock of the bit stream to produce decoded coefficients;
    selecting, for the current macroblock, a particular dictionary of the set of dictionaries according to a prediction mode signaled in the bit stream, such that one or more elements of the particular dictionary form a sparse representation of the current macroblock;
    selecting each particular element of the particular dictionary according to an index when the indices are received via the bit stream, and otherwise
    selecting the particular elements of the particular dictionary according to a copy mode signal indicating previously-used elements of the particular dictionary for reconstructing the current macroblock;
    scaling and combining, using the decoded coefficients, the particular elements to reconstruct a current decoded macroblock prediction residual signal; and
    combining the current decoded macroblock prediction residual signal with previously decoded macroblocks to generate an output macroblock of a reconstructed video, wherein the steps are performed in a decoder.

2. The method of claim 1, wherein the set of dictionaries is overcomplete.

3. The method of claim 1, wherein the prediction mode selects the dictionary to be used for decoding the current macroblock.

4. The method of claim 1, wherein the elements are selected using a matching pursuit (MP) process.

5. The method of claim 4, wherein the MP process forms a linear combination of dictionary elements by minimizing a residual of the reconstructed video.

6. The method of claim 4, wherein the MP process iterates until rate-distortion costs are minimized.

7. The method of claim 1, wherein the coefficients are binarized via a Huffman table based on statistics of the coefficients.

8. The method of claim 1, wherein the decoded prediction residual signals are obtained from previously decoded macroblocks of the video.

9. The method of claim 1, wherein the decoded prediction residual signals are obtained from decoded macroblocks of a set of training videos.

10. The method of claim 1, wherein the same dictionary elements that were used for reconstructing decoded macroblocks are used for reconstructing the current macroblock.

11. The method of claim 1 wherein a rate-distortion cost metric incorporates a rate required by the indices, the scaling coefficients, and any ancillary data needed to reconstruct the macroblock at the decoder.

12. The method of claim 1, wherein the indices are stored in a buffer for later use.

13. The method of claim 1 wherein the video is encoded by constructing a set of encoding dictionaries from samples of the video, wherein the samples are prediction residuals, further comprising;
    applying the set of encoding dictionaries to the video to generate a sparse representation of the video using elements selected from the set of dictionaries;
    quantizing the sparse representation to generate a quantized signal; and
    entropy the quantized signal to produce a bit stream.

14. The method of claim 1, further comprising:
    maintaining the set of dictionaries in an encoder to generate the encoded video.

15. The method of claim 14, wherein a cost function is used to select the set of dictionary elements that were already used for decoding a previous macroblock.

16. The method of claim 14, wherein the copy mode evaluator and the copy mode signal are applied on a particular dictionary that was trained prior to the decoding.

17. The method of claim 14, wherein the copy mode evaluator and copy mode signal are applied on a dictionary that is computed during the encoding and decoding process.

18. A decoder for decoding a current macroblock of a video encoded in a bit stream, comprising a processor for:
    selecting, a particular dictionary from a set of dictionaries according to a prediction mode signaled in the bit stream, wherein the particular dictionary includes a plurality of elements having associated indices, such that one or more of the plurality elements of the particular dictionary form a sparse representation of at least part of the current macroblock of the video;
    selecting each particular element from the plurality of elements according to an index when the indices received via the bit stream, and otherwise
    selecting the particular elements as previously-used elements of the particular dictionary for reconstructing the current macroblock; and
    decoding the current macroblock using the particular elements.

* * * * *